US012228104B2

(12) United States Patent
Hazra et al.

(10) Patent No.: US 12,228,104 B2
(45) Date of Patent: Feb. 18, 2025

(54) HARNESSING ARTESIAN AQUIFER ENERGY MODULATING PIEZOELECTRIC SPRINGS

(71) Applicant: International Business Machines Corporation, Armonk, NY (US)

(72) Inventors: Jagabondhu Hazra, Bangalore (IN); Sarbajit K. Rakshit, Kolkata (IN); Manikandan Padmanaban, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 18/313,451

(22) Filed: May 8, 2023

(65) Prior Publication Data

US 2024/0376855 A1 Nov. 14, 2024

(51) Int. Cl.
*F03B 13/06* (2006.01)
*F03B 15/00* (2006.01)

(52) U.S. Cl.
CPC .............. *F03B 13/06* (2013.01); *F03B 15/00* (2013.01); *F05B 2220/60* (2013.01); *F05B 2270/20* (2013.01); *F05B 2270/34* (2020.08)

(58) Field of Classification Search
CPC ...... F03B 13/06; F03B 15/00; F05B 2220/60; F05B 2270/20; F05B 2270/34
See application file for complete search history.

(56) References Cited

U.S. PATENT DOCUMENTS 4,282,444 A * 8/1981 Ramer .................... F03B 13/06 290/1 R
4,607,169 A * 8/1986 Donnelly, Jr. .......... F03B 13/00 62/260
6,420,794 B1 * 7/2002 Cao ......................... F03D 9/008 290/43
(Continued)

FOREIGN PATENT DOCUMENTS

CN 101359882 B 8/2011
EP 2063102 A2 5/2009
(Continued)

OTHER PUBLICATIONS

"Artesian Water and Artesian Wells", Water Science School, Jun. 6, 2018, Credit: Alan Cressler, USGS, 2 pages, <https://www.usgs.gov/special-topics/water-science-school/science/artesian-water-and-artesian-wells>.
(Continued)

*Primary Examiner* — Pedro J Cuevas
(74) *Attorney, Agent, or Firm* — Aaron Pontikos

(57) ABSTRACT

The present inventive concept provides for a method of harnessing artesian aquifer power. The method includes obtaining weather data and artesian aquifer data for a geolocation. Weather features and artesian aquifer features are extracted from the obtained weather data and artesian aquifer data, respectively. Compression and decompression events are predicted for water in an artesian well at the geolocation by mapping the weather features and the artesian aquifer features. A plurality of piezoelectric springs
(Continued)

connected to the artesian well are modulated to maximize artesian aquifer energy harnessed based on the predicted compression and decompression events.

17 Claims, 3 Drawing Sheets

(56) References Cited

U.S. PATENT DOCUMENTS

| | | | | |
|---|---|---|---|---|
| 7,615,882 | B2 * | 11/2009 | Riley | F03B 13/06 290/43 |
| 8,677,752 | B2 | 3/2014 | Dubois | |
| 11,536,240 | B1 * | 12/2022 | Madison | F03B 15/00 |
| 2006/0026961 | A1 | 2/2006 | Bronicki | |
| 2009/0121481 | A1 * | 5/2009 | Riley | F03B 13/06 290/43 |
| 2009/0212573 | A1 * | 8/2009 | Riley | F03B 13/06 290/54 |
| 2010/0045241 | A1 * | 2/2010 | Nousiainen | H02N 2/186 320/137 |
| 2010/0141094 | A1 * | 6/2010 | Lee | H02N 2/186 310/339 |
| 2015/0198033 | A1 * | 7/2015 | Vick, Jr. | E21B 47/12 340/854.3 |
| 2021/0375034 | A1 * | 12/2021 | Pan | G06T 17/05 |
| 2022/0195974 | A1 * | 6/2022 | Riley | F03B 13/08 |
| 2024/0195349 | A1 * | 6/2024 | Rakshit | H02S 10/10 |

FOREIGN PATENT DOCUMENTS

| | | | | |
|---|---|---|---|---|
| JP | 5885430 | B2 | 3/2016 | |
| WO | WO-2010062755 | A2 * | 6/2010 | E21B 33/0355 |
| WO | 2012102598 | A2 | 8/2012 | |

OTHER PUBLICATIONS

"Artesian Well—WOW!!", YouTube, downloaded from the Internet Mar. 6, 2023, 5 pages, <https://www.youtube.com/watch?v=6YgrJ1CHXug>.

"Artesian well", Wikipedia, downloaded from the Internet Mar. 6, 2023, 2 pages, <https://en.wikipedia.org/wiki/Artesian_aquifer>.

"Confined or Artesian Groundwater", NGWA, downloaded from the Internet Mar. 6, 2023, 10 pages, <https://www.ngwa.org/what-is-groundwater/About-groundwater/confined-or-artesian-groundwater>.

Bardsley, W.E., "Using groundwater for hydro electric power generation", Journal of Hydrology (New Zealand), 1995, vol. 34, No. 1, pp. 1-14.

Duan et al., "A Bridge-Shaped Vibration Energy Harvester with Resonance Frequency Tunability under DC Bias Electric Field", MDPI, Micromachines 2022, 13, 1227, Published: Jul. 31, 2022, <https://doi.org/10.3390/mi13081227>, 10 pages.

Duan et al., "Tuning the resonance frequency of piezoelectric energy harvesters by applying direct current electric field on piezoelectric elements", AIP Advances 12, 055319 (2022); https://doi.org/10.1063/5.0086657, Submitted: Apr. 6, 2022 • Accepted: Apr. 29, 2022 • Published Online: May 13, 2022, 6 pages.

Jacob, C.E., "On the Flow of Water in an Elastic Artesian Aquifer", Transactions, American Geophysical Union, 13 pages, Sep. 1940.

* cited by examiner

HARNESSING ARTESIAN AQUIFER ENERGY MODULATING PIEZOELECTRIC SPRINGS

BACKGROUND

Exemplary embodiments of the present inventive concept relate to harnessing artesian aquifer energy, and more particularly, to harnessing artesian aquifer energy by modulating piezoelectric springs.

An artesian aquifer is a confined aquifer that contains trapped water sandwiched between surrounding layers of impermeable rock and/or clay. The layers of impermeable rock and/or clay exert positive pressure on the trapped water contained within the confined aquifer. Artesian water flows upwardly when tapped due to this exerted positive pressure. Artesian aquifers have elastic properties i.e., under the influence of increasing barometric pressure, an exposed water level in a well casing is depressed. In the deeper aquifer where water is confined under pressure, a part of the transmitted load is borne by the solid matrix of the confined aquifer and the balance is borne by the confined groundwater. Consequently, the water level in the well tapping the confined groundwater is compressed/depressed an amount equal to the difference between the barometric pressure change and the portion of that change which is borne by the confined water. The present inventive concept provides for a means to harvest the energy from compression and decompression events of confined aquifers.

SUMMARY

Exemplary embodiments of the present inventive concept relate to a method, a computer program product, and a system of enhancing photosynthesis using IoT.

According to an exemplary embodiment of the present inventive concept, a method of harnessing artesian aquifer power is provided. The method includes obtaining weather data and artesian aquifer data for a geolocation. Weather features and artesian aquifer features are extracted from the obtained weather data and artesian aquifer data, respectively. Compression and decompression events are predicted for water in an artesian well at the geolocation by mapping the weather features and the artesian aquifer features. A plurality of piezoelectric springs connected to the artesian well are modulated to maximize artesian aquifer energy harnessed based on the predicted compression and decompression events.

According to an exemplary embodiment of the present invention, a computer program product is provided for harnessing artesian aquifer energy. The computer program product includes one or more computer-readable storage media and program instructions stored on the one or more non-transitory computer-readable storage media capable of performing a method. The method includes obtaining weather data and artesian aquifer data for a geolocation. Weather features and artesian aquifer features are extracted from the obtained weather data and artesian aquifer data, respectively. Compression and decompression events are predicted for water in an artesian well at the geolocation by mapping the weather features and the artesian aquifer features. A plurality of piezoelectric springs connected to the artesian well are modulated to maximize artesian aquifer energy harnessed based on the predicted compression and decompression events.

According to an exemplary embodiment of the present invention, a computer system is provided for harnessing artesian aquifer energy. The computer system includes one or more computer processors, one or more computer-readable storage media, and program instructions stored on the one or more of the computer-readable storage media for execution by at least one of the one or more processors capable of performing a method. The method includes obtaining weather data and artesian aquifer data for a geolocation. Weather features and artesian aquifer features are extracted from the obtained weather data and artesian aquifer data, respectively. Compression and decompression events are predicted for water in an artesian well at the geolocation by mapping the weather features and the artesian aquifer features. A plurality of piezoelectric springs connected to the artesian well are modulated to maximize artesian aquifer energy harnessed based on the predicted compression and decompression events.

According to an exemplary embodiment of the present inventive concept, the modulating of the plurality of piezoelectric springs includes regulating a resonance frequency of the piezoelectric springs.

According to an exemplary embodiment of the present inventive concept, the modulated resonance frequency of the piezoelectric springs is synchronized with frequencies of the predicted compression and decompression events.

According to an exemplary embodiment of the present inventive concept, the regulating of the resonance frequency of the piezoelectric springs includes changing a stiffness coefficient of the piezoelectric springs by applying a DC voltage.

BRIEF DESCRIPTION OF THE DRAWINGS

The following detailed description, given by way of example and not intended to limit the exemplary embodiments solely thereto, will best be appreciated in conjunction with the accompanying drawings, in which.

Figure 1:
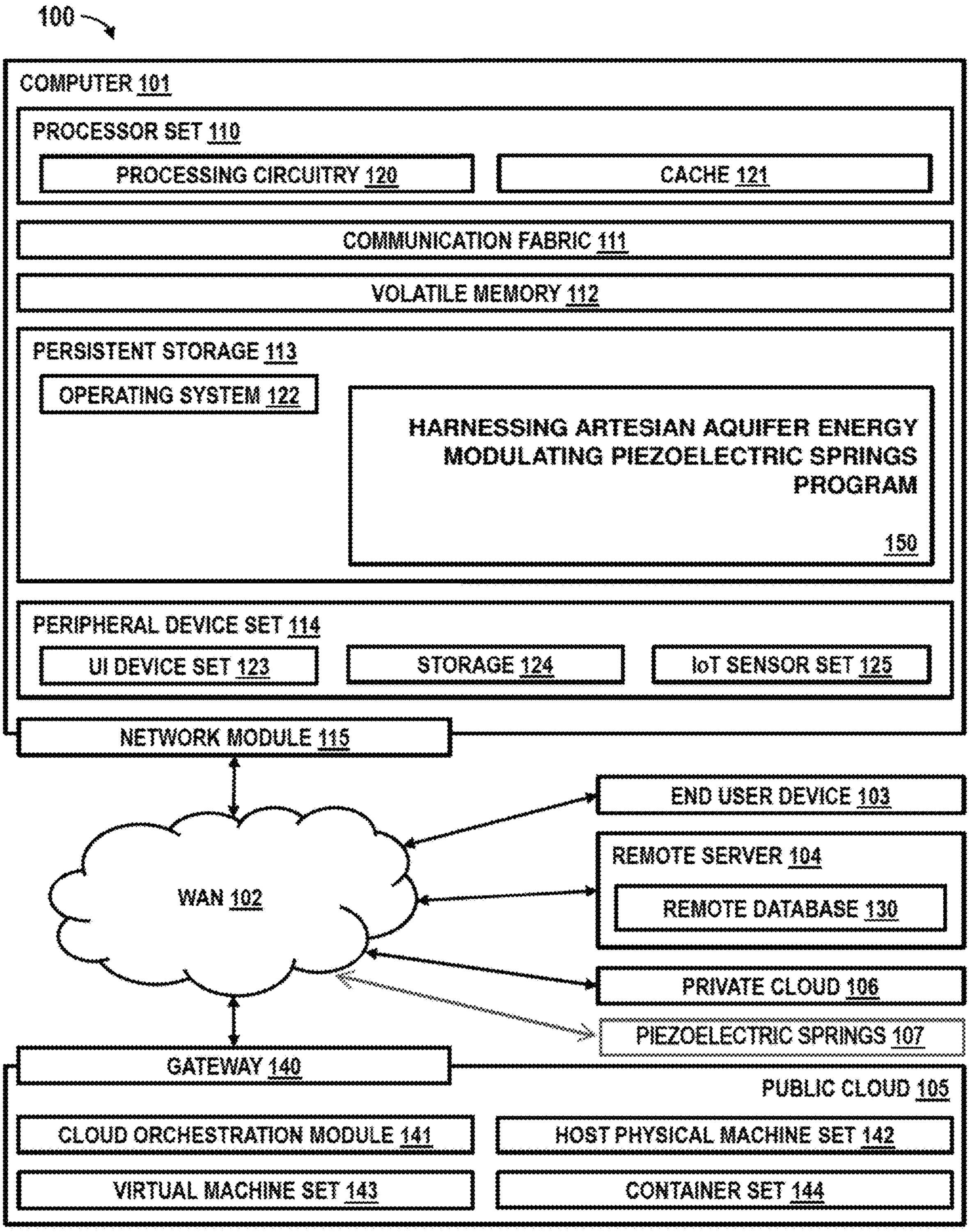
FIG. 1 illustrates a schematic diagram of computing environment 100 including a harnessing artesian aquifer energy modulating piezoelectric springs program 150, in accordance with an exemplary embodiment of the present inventive concept.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present inventive concept according to various exemplary embodiments.

As mentioned above, artesian wells allow confined groundwater in an artesian aquifer to flow upwardly towards the land surface under naturally occurring positive pressure. Exposed water in an artesian well undergoes compression and decompression events based on changes in atmospheric air pressure and the net load transmitted to the confined groundwater. While artesian wells are traditionally used to access confined groundwater reserves, provided herein is a method to harness artesian aquifer energy by modulating piezoelectric springs connected to an artesian well, thus providing a renewable, clean, and inexpensive power source.

FIG. 1 illustrates a schematic diagram of computing environment 100 including the harnessing artesian aquifer energy modulating piezoelectric springs program 150, in accordance with an exemplary embodiment of the present inventive concept.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the harnessing artesian aquifer energy modulating piezoelectric springs program 150. In addition to block 150, computing environment 100 includes, for example, computer 101, wide area network (WAN) 102, end user device (EUD) 103, remote server 104, public cloud 105, private cloud 106, and piezoelectric springs 107. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

PIEZOELECTRIC SPRINGS 107 may be any type of piezoelectric springs as known by one of ordinary skill in the art, in which a piezoelectric material is integrated into a spring mechanism, thereby allowing it to convert mechanical energy from vibrations or compression into electrical energy by utilizing the piezoelectric effect.

Figure 2:
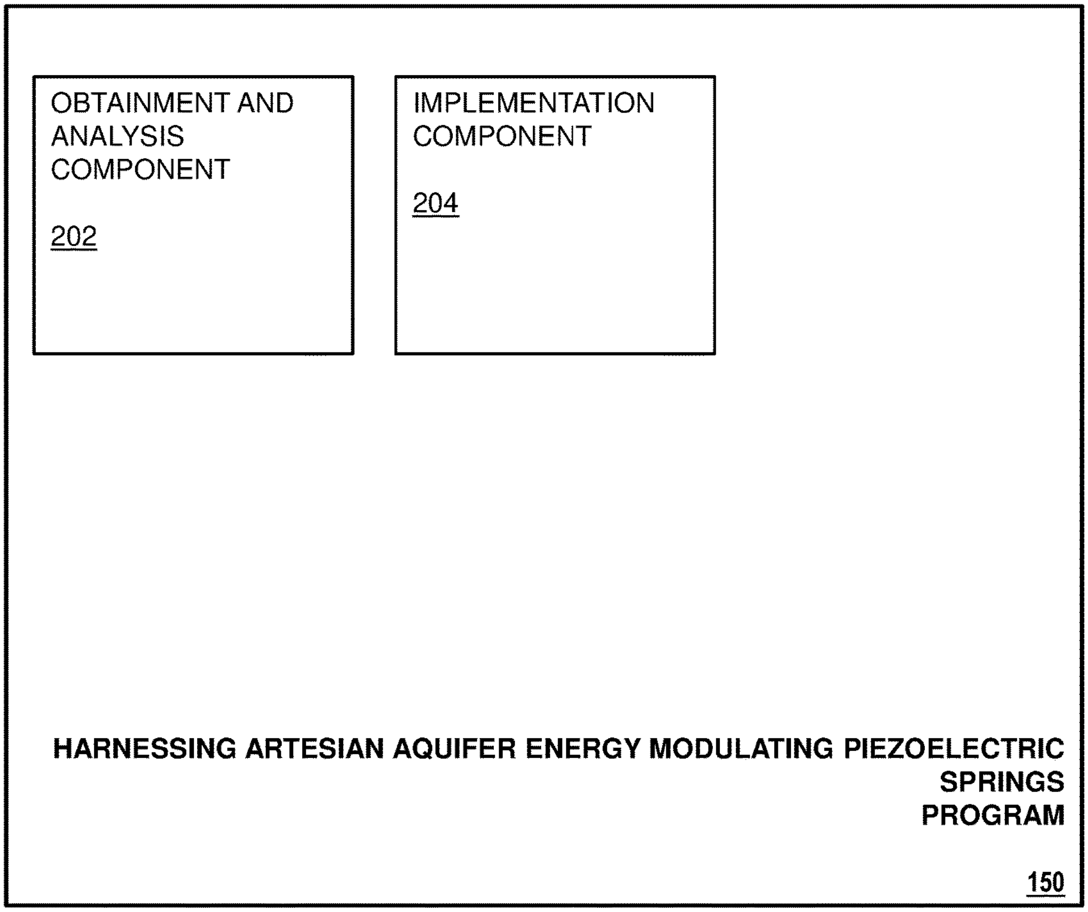
FIG. 2 illustrates a block diagram of components included in the harnessing artesian aquifer energy modulating piezoelectric springs program 150, in accordance with an exemplary embodiment of the present invention.

FIG. 2 illustrates a block diagram of components included in the harnessing artesian aquifer energy modulating piezoelectric springs program 150, in accordance with an exemplary embodiment of the present inventive concept.

An obtainment and analysis component 202 can obtain weather data and artesian aquifer data (e.g., topographical data, geological data, hydrogeological data, etc.) associated with a geolocation. The obtained weather data and artesian aquifer data can correspond to a predetermined timespan or can be obtained on a random, periodic, or continuous basis, and can be indexed by time (e.g., date, hour, month, season, etc.). The geolocation can be a predetermined area selected by a user (e.g., custom area, GPS coordinates, circular area from a locus, address, region, etc.). The weather data and artesian aquifer data can be obtained via user input, in situ measurements, imaging, IoT feed, and/or via a network search. The obtainment and analysis component 202 can analyze the weather data and artesian aquifer data with relevant machine learning processes and extract features therefrom (e.g., weather features and artesian aquifer features).

The extracted weather features can include, but are not limited to, precipitation (e.g., probabilities, quantities, durations, type, etc.); ambient temperature; atmospheric pressure, etc. The artesian aquifer features can include, but are not limited to, surface topography; artesian well dimensions (e.g., circumference, height, circular area, etc.), shapes, compositions, and/or type(s) thereof (e.g., existent artesian well, potential artesian well, flowing artesian well, non-flowing artesian well, etc.); artesian well exposed water compression and/or decompression events (e.g., fluctuating water levels, times, and/or durations thereof, relative distance to water table and/or piezometric line, etc.); confined and/or unconfined aquifer depth(s), shapes, and/or dimensions; water body types (e.g., groundwater source(s) (e.g., confined aquifer, versus unconfined aquifer) and surface water (e.g., stream, river, pond, reservoir, etc.)); water body depth(s); volume(s); confined and/or unconfined aquifer recharge attributes (e.g., frequency, recharge rate, outflow rate, and/or recharge volume, etc.); and rock and/or clay layer attributes (e.g., permeability, shapes, compositions, dimensions, elasticity, net atmospheric pressure transference to water, and/or changes attributed thereto, etc.). The obtainment and analysis component 202 can identify time-dependent patterns/variations, probabilities and degrees of potential deviations from the analyzed features. The obtainment and analysis component 202 can also estimate weather and/or artesian aquifer features apriori (e.g., estimated pressure exerted on unconfined aquifer water, water level in a non-flowing artesian well, flowing artesian well flow rate, etc.).

The implementation component 204 can map the analyzed artesian aquifer features (e.g., the obtained compression and/or decompression events of the water in the artesian well) to the weather features (e.g., atmospheric pressure(s)). The implementation component 204 can predict weather at the geolocation and impacts on artesian aquifer features (e.g., artesian well compression and decompression events (e.g., pressures, amplitudes, frequencies, durations, etc.). The obtainment and analysis component 202 can use the weather features and the artesian aquifer features to generate a harnessing artesian aquifer energy modulating piezoelectric spring model. The harnessing artesian aquifer energy modulating piezoelectric spring model can include a predictive weather model component and/or a predictive artesian aquifer property model which can be dynamically compared to existent and/or imminent conditions. The obtainment and analysis component 202 can provide an interactive virtual display to users with annotations related to the weather features and/or the artesian aquifer features.

For example, a user uses a lasso tool to select a geolocation on a virtual map that is believed to include an artesian aquifer. The obtainment and analysis component 202 retrieves topographical satellite imaging of the selected area and identifies a ridged region with a large surface water body that is a potential location of an artesian aquifer. The obtainment and analysis component 202 proceeds to obtain sonar imaging from a deployed drone and confirms a subterranean artesian aquifer and dimensions thereof. The obtainment and analysis component 202 also obtains historical weather data for the geolocation via the network. The deployed drone drills and obtains samples of the rock and/or clay layer surrounding the confined groundwater and extracts features, such as composition and elasticity. The obtainment and analysis component 202 identifies locations for a potential artesian well. The obtainment and analysis component 202 estimates the compression and decompression events for the potential artesian well based on estimated positive pressure exerted on the confined groundwater. The obtainment and analysis component 202 provides the user with a virtual display with annotations corresponding to obtained measurements and calculations based thereon. The obtainment and analysis component 202 generates a harnessing artesian aquifer energy modulating piezoelectric springs model for the artesian aquifer.

The implementation component 204 can predict energy harnessing (e.g., power yield) for an artesian well based on the mapped artesian aquifer features and weather features. The implementation component 204 can determine an optimal piezoelectric spring type, mass (e.g., load), array, and/or quantity of the piezoelectric springs 107 based on the theoretical energy harnessing and the mapped artesian aquifer and weather features. The implementation component 204 energy harnessing prediction can be further based on an energy cost of spring modulation and/or confidence levels. The implementation component 204 can determine an ideal level for the piezoelectric springs 107 (e.g., at or below the piezometric line). In an embodiment of the present inventive concept, a deployed drone can bore the artesian well and/or install the plurality of piezoelectric springs 107. The implementation component 204 can dynamically modulate the spring constant of at least some of the piezoelectric springs 107 to maximize energy harnessing based on the harnessing artesian aquifer energy modulating piezoelectric spring model. The implementation component 204 can regulate the resonance frequency (e.g., fundamental frequency (first order) or multiple frequency) of the piezoelectric springs 107 to synchronize with predicted decompression and decompression events (e.g., frequencies). For example, modulating a fundamental frequency (first order) of the piezoelectric springs 107 can produce maximum power transfer. The implementation component 204 can alter a stiffness coefficient of at least some of the piezoelectric springs 107 by applying a voltage (e.g., DC). In an embodiment of the present inventive concept, the implementation component 204 can dynamically adjust the height/level of a piezoelectric spring apparatus within an artesian well based on predicted or actual changes to artesian aquifer features and/or weather features. In another embodiment of the present inventive concept, the implementation component 204 can calculate the viability of a potential artesian well and corresponding changes to energy output and the artesian aquifer features. In the case of an artesian aquifer with a flowing artesian well, the implementation component 204 can be connected to adjustable valves to adjust the flow rate and thereby influence energy harnessing potential in the artesian well. The implementation component 204 can annotate and demonstrate predictions, real-time occurrences, deviations, and confidence levels relating to energy harnessing in the visual display for the user. The implementation component 204 can compare the predicted energy harnessed with the actual energy harnessed and tune the harnessing artesian aquifer energy modulating piezoelectric spring model accordingly.

In an embodiment of the present inventive concept, the control of the resonance frequency of the piezoelectric springs 107 can be very precise and sensitive to small step changes while taking the whole prediction horizon into account. At each step, the frequency can be chosen such that it is optimal for next 'K' steps:

$$J = \Sigma_{i=1}^{N} w_{\delta_i}(\delta_i^r) + \Sigma_{i=1}^{N} w_{L_i}(L_i^r - L_i^m)^2 + \Sigma_{i=1}^{N} w_{u\delta_i}(\Delta u)^2 + \Sigma_{i=1}^{N} w_{vL_i}(\Delta v)^2$$

subject to: $0 \le \delta_i^r \le \delta^{max}$, $0 \le L_i^m \le L^{max}$

J—cost function over the receding horizon $\delta_i^r$—Energy lost to modulate resonance frequency for the instant 'i'

$L_i^r$—natural frequency of confined aquifer for the instant 'i'

$L_i^m$—Resonance frequency for the instant 'i' u, v—energy and resonance controller variable respectively $w_{\delta_i}$, $w_{L_i}$—weighting coefficient for energy consumption and resonance energy generation respectively $w_{u\delta_i}$, $w_{uL_i}$—penalizing coefficient for big changes in energy lost and resonance energy generation respectively $\delta^{max}$, $L^{max}$—Maximum limit for power consumed by laser system and irradiance respectively For example, the implementation component 204 determines potential energy harnessing for the artesian well over a predetermined period based on predicted compression and decompression events, artesian well circumference, artesian well pressure, etc. The implementation component 204 selects an appropriate piezoelectric spring and determines the energy cost of modulating the piezoelectric springs 107 over the predetermined period of time. Because the difference between the energy harnessed and the energy cost of modulation over the predetermined period exceeds a predetermined threshold, the implementation component 204 proceeds to perform the modulation of the piezoelectric springs 107. However, the atmospheric pressure tends to exceed predictions and the artesian aquifer recharge rate falls below predicted levels, causing a diminished height of the artesian well water. The implementation component 204 determines that despite decreased confined groundwater pressure, adjusting the piezoelectric springs 107 to a lower level within the artesian well will yield similar harnessed energy. Thus, the implementation component 204 dynamically changes the level of the piezoelectric springs 107 within the artesian well and modulates the resonance frequency with DC current to coincide with the compression and decompression frequency.

Figure 3:
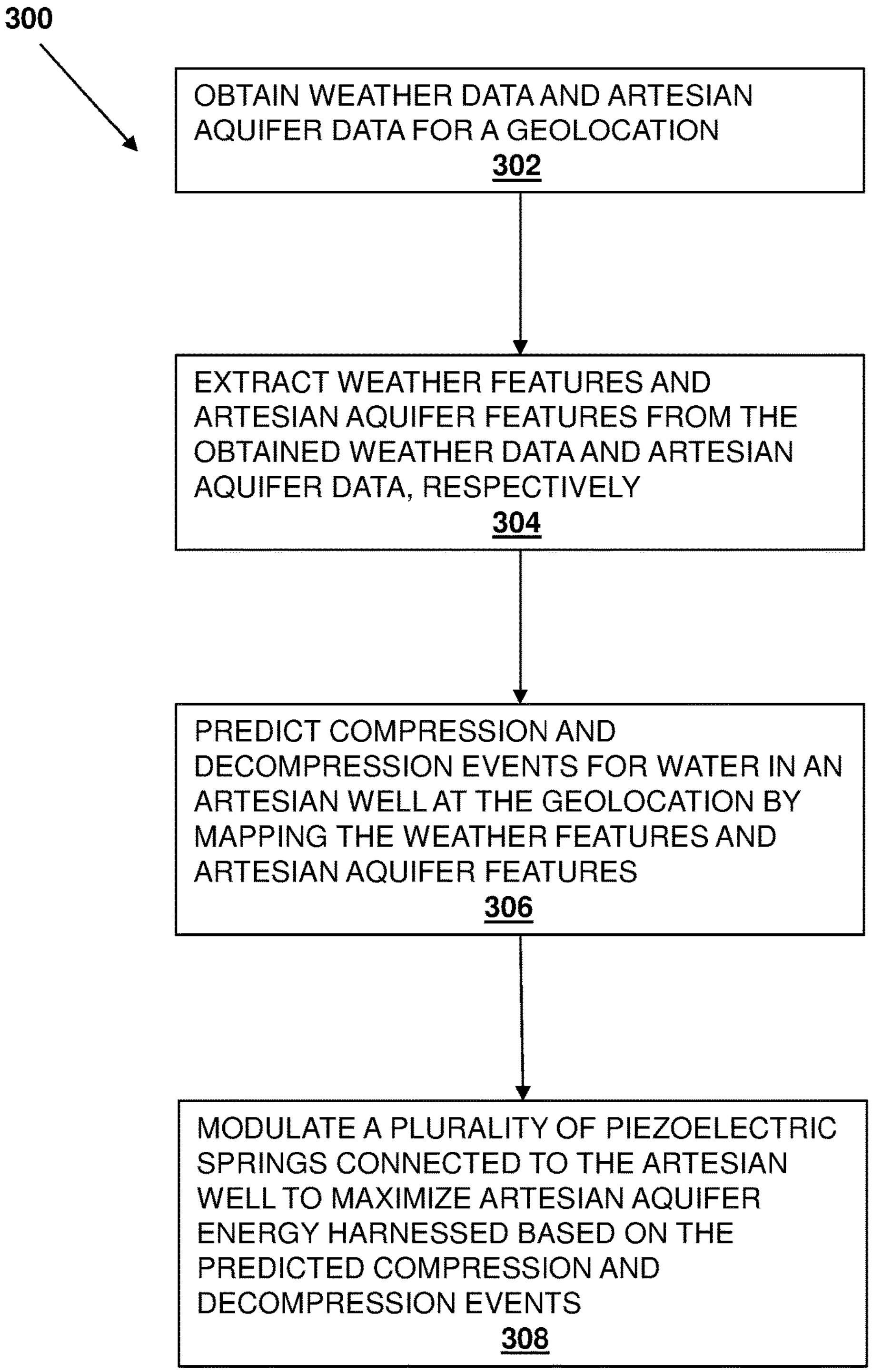
FIG. 3 illustrates a flowchart of a method of harnessing artesian aquifer energy modulating piezoelectric springs 300, in accordance with an exemplary embodiment of the present inventive concept.

FIG. 3 illustrates a flowchart of harnessing artesian aquifer energy modulating piezoelectric springs 300, in accordance with an exemplary embodiment of the present inventive concept.

The obtainment and analysis component 202 can obtain weather data and artesian aquifer data for a geolocation (step 302);

The obtainment and analysis component 202 can extract weather features and artesian aquifer features from the obtained weather data and artesian aquifer data, respectively (step 304);

The obtainment and analysis component 202 can predict compression and decompression events for water in an artesian well at the geolocation by mapping the weather features and artesian aquifer features (step 306); and The implementation component 204 can modulate a plurality of piezoelectric springs 107 connected to the artesian well to maximize artesian aquifer energy harnessed based on the predicted compression and decompression events (step 308).

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

What is claimed is:

1. A method of harnessing artesian aquifer power, the method comprising:

obtaining weather data and artesian aquifer data for a geolocation;

extracting weather features from the weather data and artesian aquifer features from the artesian aquifer data, wherein the weather features and the artesian aquifer features impact compression and decompression of water in an artesian well tapping an artesian aquifer;

predicting compression and decompression events for the water in the artesian well at the geolocation based on the weather features and the artesian aquifer features; and maximizing artesian aquifer energy harnessed by a plurality of piezoelectric springs connected to the artesian well by dynamically modulating a resonance frequency of the plurality of piezoelectric springs based on the predicted compression and decompression events for the water in the artesian well.

2. The method of claim 1, wherein the dynamically modulated resonance frequency of the piezoelectric springs is synchronized with frequencies of the predicted compression and decompression events.

3. The method of claim 1, wherein dynamically modulating the resonance frequency of the piezoelectric springs includes changing a stiffness coefficient of the piezoelectric springs by applying a DC voltage.

4. The method of claim 1, wherein dynamically modulating the plurality of piezoelectric springs is performed when harnessed energy is calculated to exceed the energy cost of modulation by a predetermined threshold.

5. The method of claim 1, further comprising:

varying a height of the plurality of piezoelectric springs within the artesian well.

6. The method of claim 1, further comprising:

adjusting the flow rate of a nearby flowing artesian well at the geolocation.

7. A computer program product for harnessing artesian aquifer power, the computer program product comprising:

one or more computer-readable storage media and program instructions stored on the one or more computer-readable storage media capable of performing a method, the method comprising:

obtaining weather data and artesian aquifer data for a geolocation;

extracting weather features from the weather data and artesian aquifer features from the artesian aquifer data, wherein the weather features and the artesian aquifer features impact compression and decompression of water in an artesian well tapping an artesian aquifer;

predicting compression and decompression events for the water in the artesian well at the geolocation based on the weather features and the artesian aquifer features; and maximizing artesian aquifer energy harnessed by a plurality of piezoelectric springs connected to the artesian well by dynamically modulating a resonance frequency of the plurality of piezoelectric springs based on the predicted compression and decompression events for the water in the artesian well.

8. The computer program product of claim 7, wherein the dynamically modulated resonance frequency of the piezoelectric springs is synchronized with frequencies of the predicted compression and decompression events.

9. The computer program product of claim 7, wherein dynamically modulating the resonance frequency of the piezoelectric springs includes changing a stiffness coefficient of the piezoelectric springs by applying a DC voltage.

10. The computer program product of claim 7, wherein dynamically modulating the plurality of piezoelectric springs is performed when harnessed energy is calculated to exceed the energy cost of modulation by a predetermined threshold.

11. The computer program product of claim 7, further comprising:

varying a height of the plurality of piezoelectric springs within the artesian well.

12. The computer program product of claim 7, further comprising:

adjusting the flow rate of a nearby flowing artesian well at the geolocation.

13. A computer system for harnessing artesian aquifer power, the computer system comprising:

one or more computer processors, one or more computer-readable storage media, and program instructions stored on the one or more of the computer-readable storage media for execution by at least one of the one or more processors capable of performing a method, the method comprising:

obtaining weather data and artesian aquifer data for a geolocation;

extracting weather features from the weather data and artesian aquifer features from the artesian aquifer data, wherein the weather features and the artesian aquifer features impact compression and decompression of water in an artesian well tapping an artesian aquifer;

predicting compression and decompression events for the water in the artesian well at the geolocation based on the weather features and the artesian aquifer features; and maximizing artesian aquifer energy harnessed by a plurality of piezoelectric springs connected to the artesian well by dynamically modulating a resonance frequency of the plurality of piezoelectric based on the predicted compression and decompression events for the water in the artesian well.

14. The computer system of claim 13, wherein the dynamically modulated resonance frequency of the piezoelectric springs is synchronized with frequencies of the predicted compression and decompression events.

15. The computer system of claim 13, wherein dynamically modulating the resonance frequency of the piezoelectric springs includes changing a stiffness coefficient of the piezoelectric springs by applying a DC voltage.

16. The computer system of claim 13, wherein dynamically modulating the plurality of piezoelectric springs is performed when harnessed energy is calculated to exceed the energy cost of modulation by a predetermined threshold.

17. The computer system of claim 13, further comprising:

varying a height of the plurality of piezoelectric springs within the artesian well.

* * * * *